(12) United States Patent
Kadyrov et al.

(10) Patent No.: US 11,100,141 B2
(45) Date of Patent: Aug. 24, 2021

(54) MONITORING ORGANIZATION-WIDE STATE AND CLASSIFICATION OF DATA STORED IN DISPARATE DATA SOURCES OF AN ORGANIZATION

(71) Applicant: Microsoft Technology Licensing, LLC, Redmond, WA (US)

(72) Inventors: Farid Kadyrov, Tatarstan (RU); Mandy Kathleen Meyers, Issaquah, WA (US); Randi Scheinblum Ryan, Seattle, WA (US); Douglas Taylor, Burien, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 160 days.

(21) Appl. No.: 16/151,321

(22) Filed: Oct. 3, 2018

(65) Prior Publication Data
US 2020/0110832 A1    Apr. 9, 2020

(51) Int. Cl.
*G06F 16/28* (2019.01)
*G06F 16/2457* (2019.01)
*G06F 16/248* (2019.01)
*G06F 3/0482* (2013.01)

(52) U.S. Cl.
CPC .......... *G06F 16/285* (2019.01); *G06F 3/0482* (2013.01); *G06F 16/248* (2019.01); *G06F 16/24578* (2019.01)

(58) Field of Classification Search
CPC .............. G06F 16/285; G06F 16/24578; G06F 16/248; G06F 3/0482
See application file for complete search history.

(56) References Cited

U.S. PATENT DOCUMENTS

| | | |
|---|---|---|
| 7,302,569 B2 | 11/2007 | Betz et al. |
| 7,716,242 B2 | 5/2010 | Pae et al. |
| 8,561,185 B1 | 10/2013 | Muthusrinivasan et al. |
| 8,752,181 B2 | 6/2014 | Grzymala-Busse et al. |
| 8,875,284 B1 | 10/2014 | Newstadt et al. |
| 9,785,795 B2 | 10/2017 | Grondin et al. |
| 2011/0264663 A1* | 10/2011 | Verkasalo .......... G06Q 10/0637 707/740 |
| 2013/0173539 A1 | 7/2013 | Gilder et al. |

(Continued)

OTHER PUBLICATIONS

"Angular CLI", Retrieved from: https://web.archive.org/web/20160128184826/https://github.com/angular/angular-cli, Jan. 28, 2016, 03 Pages.

(Continued)

*Primary Examiner* — Jay A Morrison
(74) *Attorney, Agent, or Firm* — Fiala & Weaver P.L.L.C.

(57) ABSTRACT

A computer system receives data identifying data fields used by sources of data and infrastructure information. The computer system maintains a storage state database to track information about the data fields. The computer system provides a graphical user interface through which a user can create, view, modify, and delete data defining classes and rules associated with classes. The computer system applies the rules to classify the data fields. The computer system provides a graphical user interface through which the classification of the data fields can be visualized in the context of infrastructure information for the sources of data.

20 Claims, 10 Drawing Sheets

(56) References Cited

U.S. PATENT DOCUMENTS

| | | | |
|---|---|---|---|
| 2014/0304263 A1* | 10/2014 | Vaitheeswaran | G06F 16/285 707/737 |
| 2015/0326601 A1* | 11/2015 | Grondin | G06F 21/6245 726/25 |
| 2016/0342811 A1 | 11/2016 | Whitcomb et al. | |
| 2019/0155941 A1* | 5/2019 | Bhide | G06N 20/00 |
| 2019/0258731 A1* | 8/2019 | Mikhailov | G06F 16/213 |
| 2019/0286646 A1* | 9/2019 | Kraytem | G06F 16/381 |

OTHER PUBLICATIONS

Klehr, Marcel, "Nodist", Retrieved from: https://web.archive.org/web/20131027131136/https://github.com/marcelklehr/nodist, Oct. 27, 2013, 06 Pages.

"International Search Report and Written Opinion Issued in PCT Application No. PCT/US2019/054295", dated Feb. 27, 2020, 12 Pages.

Wenzel, et al., "Set up a Hosting Environment for asp.net Core on Windows with IIS, and Deploy to it", https://web.archive.org/web/20170606183045/https://docs.microsoft.com/en-us/aspnet/core/publishing/iis#install-the-net-core-windows-server-hosting-bundle, Mar. 13, 2017, 23 Pages.

* cited by examiner

MONITORING ORGANIZATION-WIDE STATE AND CLASSIFICATION OF DATA STORED IN DISPARATE DATA SOURCES OF AN ORGANIZATION

BACKGROUND

Because computer storage is inexpensive, organizations can collect and retain large volumes of data in multiple different environments. A difficulty which organizations face with having a large volume of data is knowing what kinds of data are stored, where they are stored, and who can access, or has accessed, the data. Stored data may include health data, personally identifiable information, financial information or other regulated or sensitive information. There may be governmental regulations or corporate policies or procedures with respect to such data, for which compliance is to be monitored and enforced. To comply with such regulations, policies, or procedures, organizations generally start with determining what kinds of data they store and where data are stored.

Determining what kinds of data are stored and where the data are stored is not a simple problem. Most data sources are designed to solve a problem unrelated to regulations, policies, and procedures, and therefore typically do not include information related to these regulations, policies, and procedures. Organizations also use a wide variety of different infrastructures to support these data sources, such as different environments, physical locations, logical configurations, and types of hardware and software. Identifying and classifying data to ensure compliance with regulations, policies, and procedures under such conditions is a challenging problem.

SUMMARY

This Summary is provided to introduce a selection of concepts in a simplified form that are further described below in the Detailed Description. This Summary is intended neither to identify key or essential features, nor to limit the scope, of the claimed subject matter.

A computer system receives information describing sources of data available on an organization's computer network. Such sources of data can include, for example, data sources, such as relational and object-oriented databases, streaming storage for "big data" applications, and binary large objects. The received information identifies data fields in which data are stored in these sources, and data describing the infrastructure supporting them.

The computer system maintains a storage state database to track information about the identified data fields from each source, such as names of data fields, and data about the source. The data about a source can include infrastructure information, such as data describing the environment for the source, as a physical location of the source, logical configuration of the source, a type of server computer supporting the source, type of data management system used by the source, and collections of data within the source.

The storage state database receives and stores data about the structure in which data is stored in the sources, without accessing or analyzing the data itself. For example, if the source of data is a relational database with tables of data about a set of people working in an office, the source may store information such as the first name, last name, title, and office location for individuals. In this example, the source may include the data fields such as "first name", "last name", "title", and "office location". The computer system would not need to read the actual data about the individuals stored in these data fields in the multiple records in the database.

The computer system uses the storage state database to enable users in an organization to understand what kinds of data are stored in these data fields in the context of the sources on which they are stored. The computer system provides a way for users to define classes, a classification hierarchy, and rules for classifying the data fields. The computer system then classifies the data fields and provides a way for a user to visualize the resulting classification of the data fields.

The computer system has a first graphical user interface, herein called an administration interface, through which a user can interactively create, view, modify, and delete classes and rules associated with those classes. Classes also may be called categories. Classes may be organized into a classification hierarchy, in which classes, or categories, may be grouped into subclasses or groups. The classification hierarchy and rules specify how the data fields are classified into the classes. The administration interface enables a user to define one or more rules for a class, which determine whether a data field is classified into that class. The computer system applies these rules to generate additional information, such as a classification, for the data fields in the storage state database. An indication of a class into which a data field is classified can be stored as additional information for that data field in the storage state database.

The computer system has a second graphical user interface, herein called a visualization interface, through which a user can interactively visualize information from the storage state database. For example, the visualization interface can provide graphical representations of the kinds of data stored, where the data are stored, and other information about the sources of data on the computer network. Different kinds of views focused on environments, sources of data, and data fields having common attributes, are among the kinds of views that can be provided.

The storage state database can be further processed to add additional data about the different data fields and data sources, such as access logs related to the data. Through the administration interface, rules also can be defined for, and applied to, this additional data to provide yet further information about the data fields in the storage state database. This additional data and further information also can be presented in the visualization interface.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
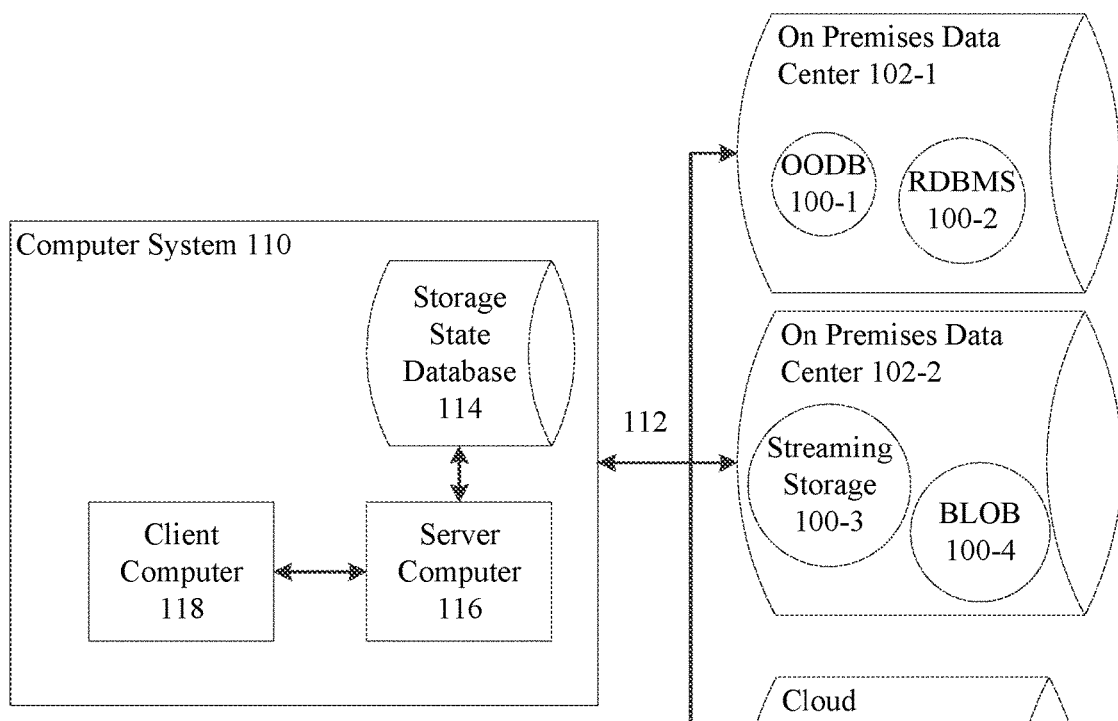
FIG. 1 is a block diagram of an example computing environment including a computer system with a storage state database and related components.

FIG. 1 is a block diagram of an example computing environment, typical for an organization, with multiple sources of data interconnected on a computer network, which includes a computer system with a storage state database and related components.

In FIG. 1, a plurality of sources 100-1 to 100-N (individually or collectively herein referred to as source or sources 100) of data are shown schematically as individual circles. Each source 100 generally stores data in a computer storage device (not shown) which is accessible through a server computer (not shown) that manages its corresponding computer storage device. The server computer executes one or more computer programs, herein called a data management system, which configures the server computer to allow data to be stored, queried, and accessed. A server computer can support multiple sources 100 of data; in some instances, a source 100 of data may be supported by multiple server computers. Such sources 100 of data generally are responsive to requests from other computers over computer networks 112 to access the data stored on the sources 100.

Within an organization, there may be several types of sources, each with a corresponding type of server computer and type of data management system. Example types of sources include, but are not limited to, a relational database, an object-oriented database, binary large objects, and streaming storage, which are shown for illustrative purposes in FIG. 1 as, e.g., OODB 100-1, RDBMS 100-2, streaming storage 100-3, or BLOB 100-4.

Data about a source can include, for example, data indicating a name and/or an identifier of the source, data about its server computer, and data about its data management system. Data about a server computer can include, for example, data indicating a name and/or an identifier of the server computer, other characteristics of the server computer, a reference to an environment housing the server computer, and a reference to any source of data housed on the server computer. Information indicating how the server computer is connected to an organization's computer network is configuration information.

The sources 100 of data generally are physically located in one or more environments, illustrated schematically by the items 102-1 to 102-M (collectively and individually referred to as environments 102), such as a data center or cloud environment. A data center is a building that houses many computers that support sources 100 of data. For an organization, there are generally multiple types of environments, classified based on several factors, such as location, security and environmental controls. For the purposes of illustration, FIG. 1 shows three types of environments: a level 1 data center (102-1) and a level 2 data center (102-2), which for the purposes of this example can be considered on-premises data centers, and an off-premises cloud environment (102-3). An on-premises data center is in a physical location controlled by the organization and accessible within the organization on the organization's private computer network. An off-premises cloud environment is in a physical location that may not be controlled by the organization, and generally is accessible over a virtual private network running over a public computer network. Data about an environment can include data indicating a name, type, physical location, level of security and environmental controls, server computers housed within the environment, etc.

End user computers (not shown), both within the organization and outside the organization, can connect to the one or more sources 100 of data over one or more computer networks 112. The computer network(s) 112 can be any computer network supporting interaction between the end user computers and the shared storage system, such as a local area network or a wide area network, whether private and/or publicly accessible, and can include wired and/or wireless connectivity. The computer network can be implemented using any of several available network communication protocols, including but not limited to Ethernet and TCP/IP.

With a large amount of data stored on many sources 100 in disparate environments, it can be difficult for an organization to maintain up-to-date information about what kinds of data are stored and where the data are stored. The computer system described below enables an organization to classify data stored on disparate sources 100 into classifications that can be flexibly defined by the organization. The classification can operate independently of the operation of the data sources 100 and does not need to read the stored data, resulting in minimal impact on the operation of the data sources 100.

To address this problem, a computer system 110, optionally connected to the computer network 112, receives information describing the sources 100 of data available on the computer network 112. The received information identifies data fields in which data are stored in these sources. The computer system 110 maintains a storage state database 114 to track information about the identified data fields from each source, such as names of data fields and data about the source. The data about the source can include infrastructure information, such as data describing the environment for the source, as a physical location of the source, logical configuration of the source, a type of server computer supporting the source, type of data management system used by the source, and collections of data within the source. An example structure for the storage state database 114 is provided below in connection with FIG. 3.

The storage state database 114 receives and stores information about the structure in which the data is stored in the sources 100, without accessing or analyzing the data itself. For example, if the source 100 of structured data is a relational database with tables of data about a set of people working in an office, the source may store information such as the first name, last name, title, and office location for individuals. In this example, the source may include data fields such as "first name", "last name", "title", and "office location". The computer system would not need to read the actual data about the individuals stored in these data fields in the multiple records in the database.

The computer system 110 uses the storage state database 114 to enable users in an organization to understand what kinds of data are stored in these data fields in the context of the sources 100 on which they are stored. An example implementation of such a storage state database is described in more detail below. The computer system provides a way for users to define classes, a classification hierarchy, and rules for classifying the data fields. The computer system then classifies the data fields and provides a way for a user to visualize the resulting classification of the data fields. An example implementation of such a computer system is described in more detail below.

The computer system 110 can include a server computer 116 and optionally a client computer 118. The functionality described herein for a client computer can be provided on the server computer 116 instead of on the client computer. One or more client computers 118 can access the server computer 116. If a client computer is used, the client computer provides an interface through which a user can interact with the server computer. In this context, a client application (not shown) is a computer program (such as a browser application) executed on the client computer that configures the client computer to provide a graphical user interface to display data received from the server computer and to be responsive to user input and transmit data to the server computer, which allows the user to interact with the server computer 116. The server computers and client computers in FIG. 1 can be implemented using a computer such as described in connection with FIG. 11. Such a computer can be configured using computer program instructions to implement functionality for a computer system 110 as described herein, an example implementation of which described below in connection with FIGS. 2-10.

One example implementation of the computer system 110 will now be described in connection with FIGS. 2-10. This is only an example implementation for the purposes of illustration, not intended to be limiting in any respect. Many other implementations are possible.

Figure 2:
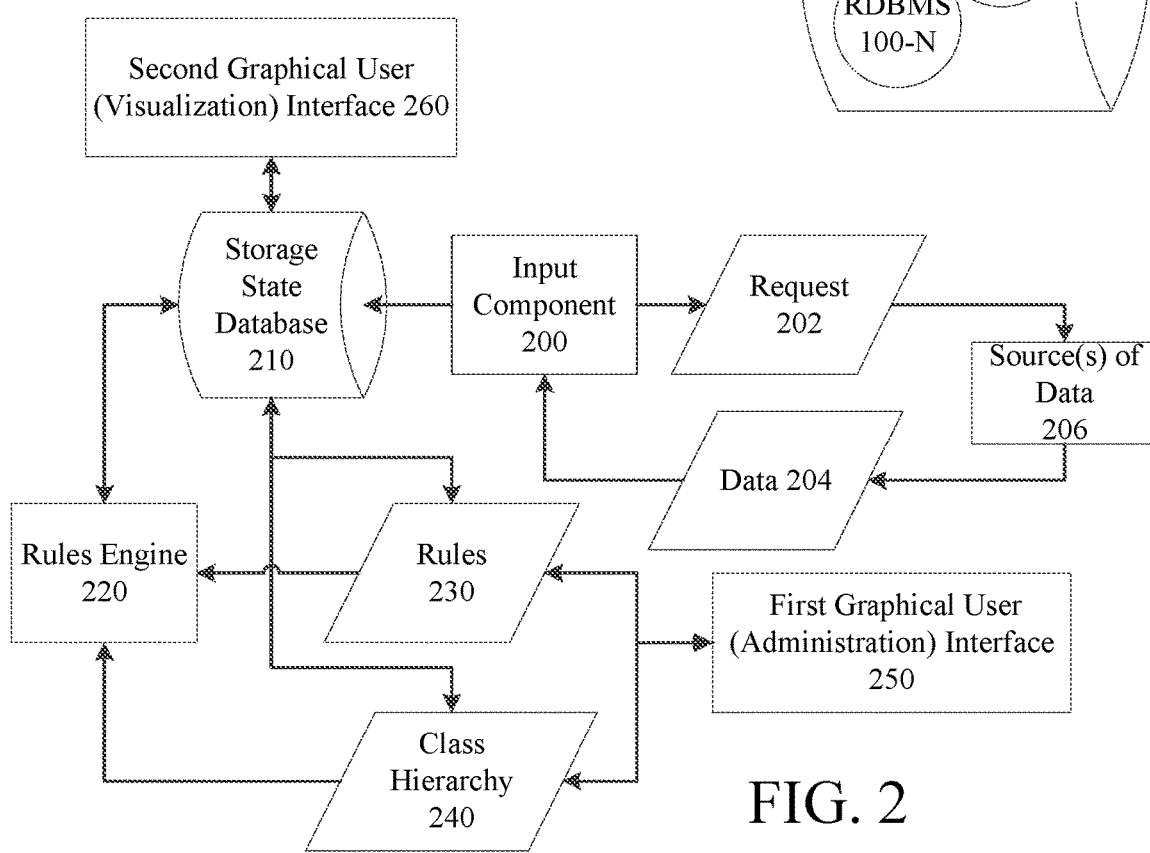
FIG. 2 is a data flow diagram of an illustrative example implementation of a computer system using a storage state database.

Referring now to FIG. 2, the computer system includes an input component 200, which is a computer program executed on the server computer (116 in FIG. 1) that configures the server computer to receive and store data about the data fields stored in sources 100, and infrastructure information about the sources 100. As shown in FIG. 2, in some implementations, the input component 200 can issue one or more requests 202 to a source 206 of data, which in turn provides data 204 describing the data fields used by the source 206. For example, where the source is a database that can provide its schema in response to a request, the input component 200 can issue such a request. Such requests can occur periodically. In some implementations, a source of data can transmit the data 204 without requiring a request, and such transmission can occur periodically. In some implementations, the data 204 can be retrieved from the source 206 through an operator manually entering an instruction to the source 206 to access the data, and the data 204 can then be transmitted to the input component 200.

The computer system includes a storage state database 210 (114 in FIG. 1) which stores information about the data fields used in each source 206 (also 100 in FIG. 1) and infrastructure information about the sources. The storage state database may be a database stored on the server computer (116 in FIG. 1) or on a separate computer that communicates with server computer 116. The input component 200 processes data 204 about the sources and stores such information in the storage state database 210.

The computer system also includes a rules engine 220, which is a computer program executed on the server computer (116 in FIG. 1) that configures the server computer to apply rules definitions 230, according to a classification hierarchy 240, to the storage state database 210, to classify the data fields. An example implementation of a classification hierarchy and rules definitions will be described in more detail below in connection with FIGS. 3-7. Data defining the rules definitions 230 and the classification hierarchy 240 can be stored in the storage state database 210.

The computer system includes a first graphical user interface 250, hereinafter called an "administration interface", through which a user can interactively create, view, modify, and delete classes and rules associated with those classes. Classes also may be called categories. Classes may be organized into a classification hierarchy, in which classes, or categories, may be grouped into subclasses or groups. Information defining rules are stored as the rule definitions 230. Information defining classes and a classification hierarchy are stored as the classification hierarchy 240. The classification hierarchy and rules specify how the data fields are classified into the classes. The administration interface enables a user to define one or more rules for a class, which determine whether a data field is classified into that class. The computer system applies these rules to generate additional information, such as a classification, for the data fields in the storage state database. An indication of a class into which a data field is classified can be stored as additional information for that data field in the storage state database. The administration interface can be implemented, for example, on a client computer as web pages displayed by a browser application. An example implementation is described in more detail below in connection with FIGS. 5-7.

The computer system includes a second graphical user interface 260, hereinafter called a "visualization interface", through which a user can interactively visualize information from the storage state database. For example, the visualization interface can provide graphical representations of the kinds of data stored, where the data are stored, and other information about the sources of data on the computer network. Different kinds of views focused on environments, sources of data, and data fields having common attributes, are among the kinds of views that can be provided. The second graphical user interface can be implemented, for example, on a client computer as web pages displayed by a browser application. An example implementation is described in more detail below in connection with FIGS. 8-10.

Figure 3:
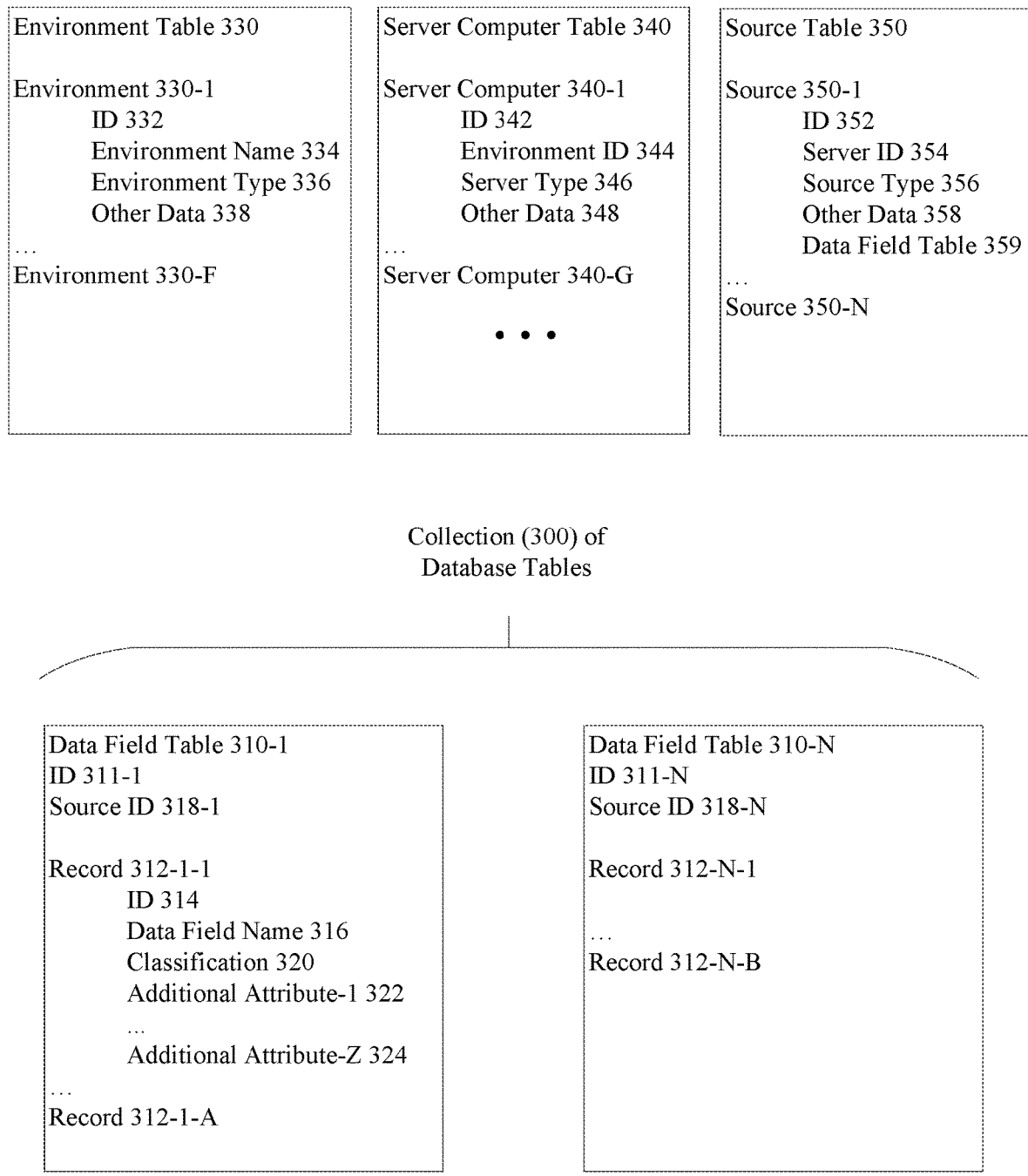
FIG. 3 is a diagram of an illustrative example of data structures for storing data for the storage state database.

Turning now to FIG. 3, a diagram of an illustrative example of data structures for storing data for the storage state database will now be described. In this example implementation, a data field table 310 is created for each source 100 (FIG. 1) for which information is received. The storage state database thus includes a collection 300 of data field tables 310-1 to 310-N (collectively and individually 310 hereinafter). If a source 100 has multiple database tables, or other collections of data such as streams in a streaming storage source, a separate data field table 310 can be generated for each table or collection within the source; alternatively, the data fields of all collections of information within the source can be collected into a single data field table 310 for that source.

Each data field table 310 can be associated with information about the source and the infrastructure supporting the source, including but not limited to the server computer supporting the source, and the environment housing the server computer. Such can be stored in additional database tables 330-350 described below. Such infrastructure information allows the data field information in the data field tables 310 to be organized, viewed, and manipulated based on the infrastructure information. The infrastructure information can be stored in several ways, such as data associated with a data field table 310, or as additional tables 330-350, also described below.

Referring now to an illustrative data field table, e.g., 310-1, a data field table can have an identifier 311-1 to allow other objects, see below, reference that data field table. A source identifier 318-1 indicating the source containing the fields in the data field table can be stored. A data field table includes a collection of records (shown as records 312-1-1 to 312-1-A in table 310-1, and as records 312-N-1 to 312-N-B in table 310-N, collectively and individually hereinafter as "312"). A record 312 includes data representing the data field used by the corresponding source. The data representing the data field can include, for example, an identifier 314 and a name 316 for the data field.

A record 312 in the storage state database also includes data indicating a classification 320 of the data field, and optionally one or more attributes (e.g., Additional Attribute-1 (322) through Additional Attribute-Z (324)). For some of the attributes in a record 312, such as the classification 320, the computer system (110, FIG. 1) determines values for these attributes, and enters the determined values into the record 312. For some of the attributes in a record 312, such as the data field name 316, the computer system may receive values for these attributes and process and enter those values into the record 312.

In some implementations, the information about the infrastructure supporting the sources can be captured in database tables, such as shown at 330-350 in FIG. 3. By tracking information about the infrastructure, the computer system can evaluate together different sources supported by disparate types of infrastructure and can enable visualization based on the infrastructure information.

In FIG. 3, an environment table 330 can store information about different environments. An environment has a corresponding record (330-1 to 330-F) in the environment table which stores an identifier 332 for the environment, a name 334 for the environment, a type 336 for the environment (e.g., on-premises data center, cloud environment), and other data 338 about the environment.

A server computer table 340 can store information about different server computers. A server computer has a corresponding record (340-1 to 340-G) in the server computer table which stores an identifier 342 for the server computer, an identifier 344 for the environment housing the server computer, a type 346 of the server computer, and other data 348 about the server computer.

A source table 350 can store information about different sources. A source has a corresponding record (350-1 to 350-N) in the source table which stores an identifier 352 for the source, an identifier 354 for the server computer supporting the source, a type 356 of the source, and other data 358 about the source. A reference 359 to a data field table (310), such as by using the identifier (311) for that data field table, can be stored in an entry for a source in the source table. If there are collections of data fields within sources, such as tables in a database or streams in a streaming storage system, data about these collections also can be captured and stored in the source table and/or optionally additional tables for such collections. The reference 359 may refer to one or more collections of data fields within the sources, and the collections of data fields may in turn be associated with data field tables 310.

The available types of environments, server computers and sources can be configurable by an administrator user of the computer system 110. The infrastructure information for the sources can be obtained and processed separately from the information about the data fields stored in the sources. The representation of different types of infrastructure within different categories of infrastructure allows the data fields stored in different sources of data across disparate environments to be classified and visualized together under the same classification system.

Turning now to FIGS. 4 through 7, an example implementation of how data fields can be classified, such as by using the storage state database shown in FIG. 3, will now be described. In this example implementation, a user defines rules which the computer system applies to the records 312 in the data field tables 310. In the context of classifying a data field into one of a plurality of classes, a rule is associated with a class and comprises a condition applied to data associated with the record 312 for the data field. If the condition of a rule is met, the rule "fires", causing the data field to be classified into the class associated with the rule.

The classes can be ordered into a hierarchy, such that one can define a lowest class (e.g. least sensitive data) and a highest class (e.g., most sensitive data). The rules can be applied to each record from the lowest class to the highest class, such that each record is assigned to the highest class the rules can specify for that record. If no rule "fires" for a given record, the data field represented by that record can be considered "unclassified" or "not categorized". A special code can be used to indicate that a data field is unclassified. In one implementation, records 312 in a data field table 310 can be prepopulated with such a code as a default classification before the rules are applied to the records in that data field table 310.

In this example, the conditions specified in the rules are generally in the form of Boolean string operations applied to the name 316 of a data field, such as "'Data Field Name' contains '<text>'", where <text> can be an arbitrary string. A string operation is function applied to a string of characters, for example truncating the string, extracting a section of the string, removing characters from the string, etc. An operation is a Boolean operation if the output is binary (e.g., "0" or "1", or "true" or "false", or "yes" or "no", etc.), such as a comparison operation like "contains" or "ends with" or "starts with". Boolean string operations are just an example kind of operation; conditions of rules can be defined using any kind of operation that applies a function to the data fields in the storage state database to allow the computer to determine whether a given data field is or is not in a class associated with a given rule.

Figure 4:
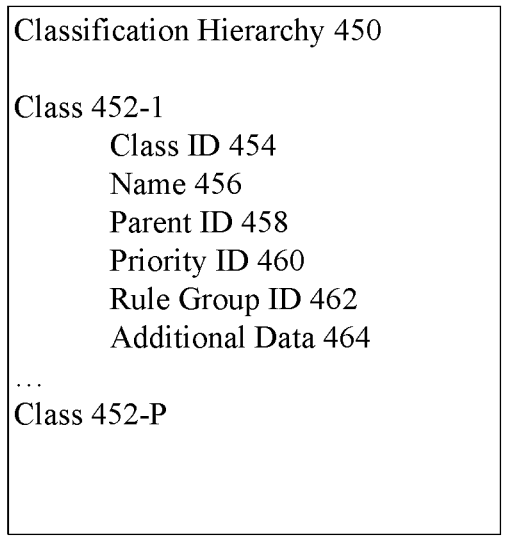
FIG. 4 is a diagram of an illustrative example of data structures for storing data representing rules and classification hierarchy definitions.
Figure 4:
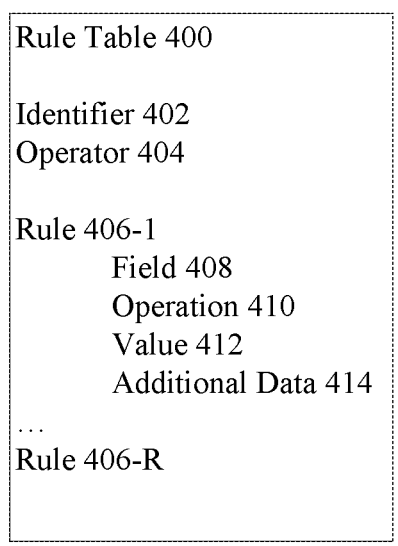
Figure 4:
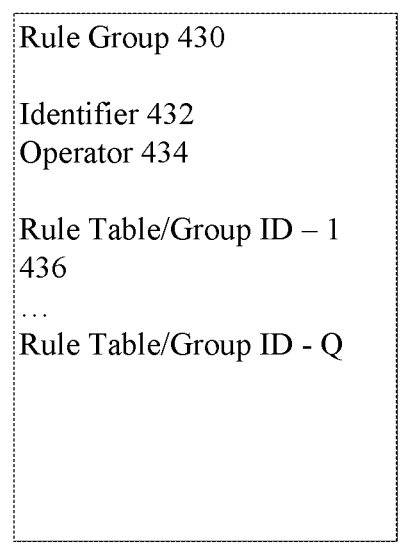

FIG. 4 is a diagram of an illustrative example of data structures for storing data representing rules and classification hierarchy definitions.

In FIG. 4, in this example implementation, rules can be specified using a plurality of rule tables 400. A rule table 400 has an identifier 402 and represents a group of rules 406-1 to 406-R (hereinafter, collectively and individually "406"). A rule table 400 includes an operator 404 indicating how the rules 406 within the group are logically combined, such as by a logical operator "AND" or "OR". In this implementation, each rule 406 specifies a data field 408, an operation 410 applied to that data field, and a value 412 which is another input to the operation 410. The operation 410 is applied to the data field using value 412 to provide a result. Additional data 414 about the rule also can be stored, such as a date/time the rule was created or last modified, an indication of an end user that created or last modified the rule, or other data about the rule.

Rules can be grouped to facilitate their editing and presentation. A rule group 430 has an identifier 432 and has a logical operator 434 indicating how rule tables or other rule groups included in the group 430 are logically combined, such as by a logical operator "AND" or "OR". The rule group 430 specifies, using identifiers 436, the rule tables or rule groups included within the rule group 430. In some implementations, a first type of rule group can include groups of rule groups 430, and a second type of rule group can include groups of rule tables 400. As described in more detail below, each class in a classification hierarchy can be associated with one or more rule groups 430.

In this example, the rule tables 400 and rule groups 430 can be provided for, and applied to, all data field tables 310; but, in other implementations, a separate collection of rule tables can be provided for different sources or categories of sources, for example based on infrastructure information.

The classification hierarchy 450 specifies the classes into which data fields can be classified. There are several ways to implement a classification hierarchy, and FIG. 4 provides an illustrative example. The classification hierarchy includes data representing a plurality of classes 452-1 to 452-P (hereinafter, collectively and individually 452). Each class 452 has a class identifier (ID) 454. The class ID can be used, for example, to relate the class to other classes. A name 456 for the class can be stored, preferably as human readable text or as data that can be readily converted to human readable text for when information about the class is presented to an end user. Any additional data 464 about the class, or the classification hierarchy, such as a date/time the class or hierarchy was created or last modified, an indication of an end user that created or last modified the class or hierarchy, or other data, can be included.

The classification hierarchy also can include information specifying a relative priority among the classes. There are many ways to implement such a specification, using any data structure that can represent an ordered collection, such as an ordered tree. In the example shown in FIG. 5, a class 452 can include data indicating any parent class in which it is classified, using the class identifier 454 of its parent class, and its relative priority within that parent class, using the class identifier 454 of its immediately higher priority class within that parent class.

The classification hierarchy also includes information associating the classes with rules. In this example, a class can be associated with a rule group as indicated at 462. The identified rule group for a class 452 can in turn include one or more other rule groups and one or more rule tables that, in combination, determine whether a data field is classified in the class 452.

Having now described an illustrative example of data structures for the storage state database, including data representing infrastructure information, data fields, rules, and classes, example graphical user interfaces for defining rules and classes will now be described. These graphical user interfaces allow end users to define classes and rules in a flexible, interactive and intuitive manner, in the context of solving the problem of understanding what kinds of data are stored, and where the data are stored, in disparate sources of data of an organization. With these interfaces interacting with the storage state database, the definition of classes and rules, and their application to the data fields, is performed separately from the sources of data themselves. Therefore, data stored in the sources can be classified without impacting the performance or operation of those sources of data. Also, the separately defined classes and rules can be applied to any data fields of any source supported on any type of infrastructure, so long as the information about the data fields and infrastructure of the source can be entered in the storage state database. Such an interface also lets users determine which classes of data are relevant, their relative priorities, and how rules define the classes in which data fields are classified.

Figure 5:
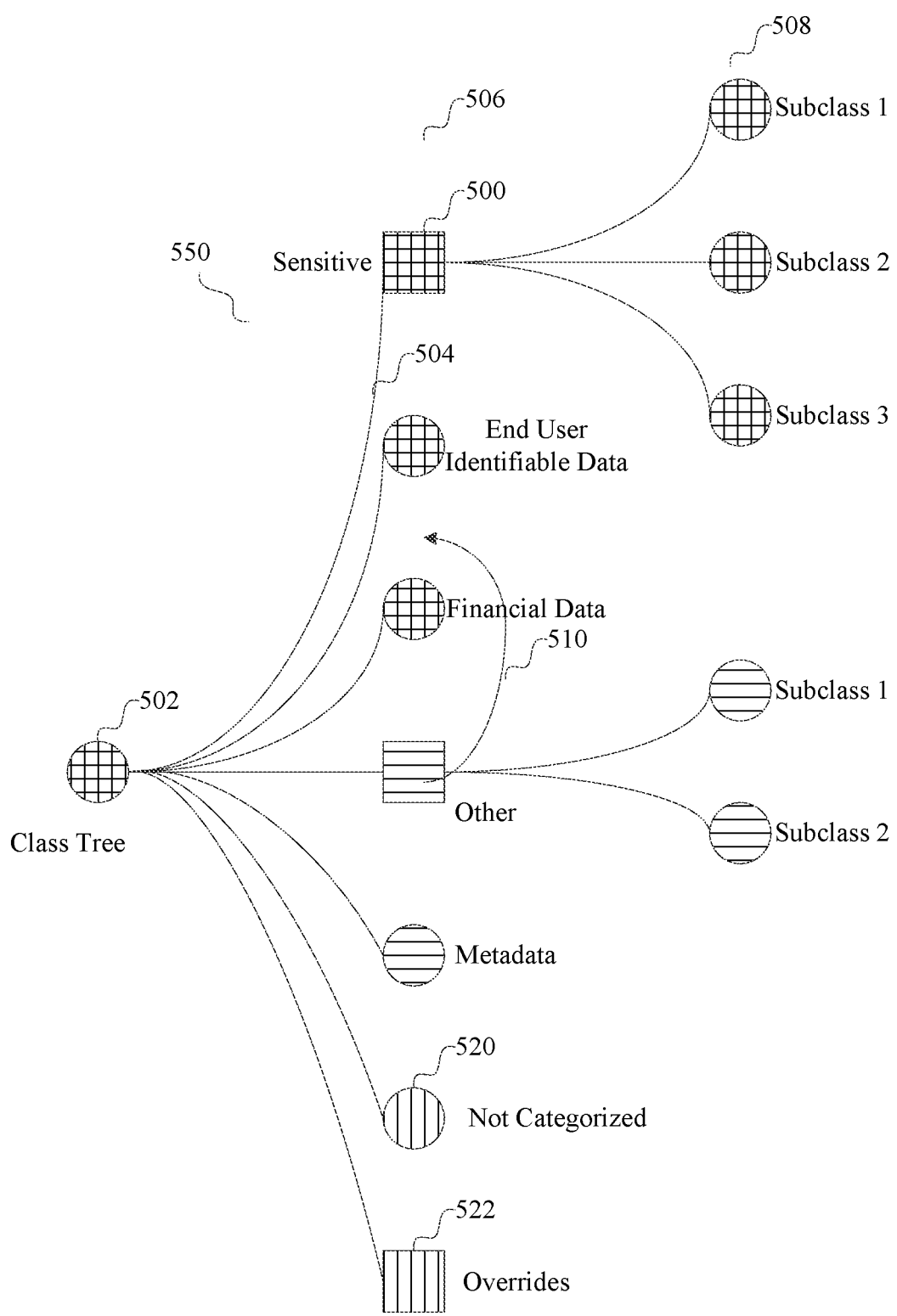
FIG. 5 is an illustration of an example graphical user interface for specifying a classification hierarchy for applying rules.

FIG. 5 is an illustration of an example implementation for the first graphical user interface (250 in FIG. 2), or administrator interface, which allows a user to specify classes in a classification hierarchy. This example implementation of the administrator interface also includes an interface, describe below in connection with FIG. 6, through which rules can be defined for a class.

In FIG. 5, an interface 550 allows a user to create, view, and modify a class hierarchy, and to create, view, modify, and delete classes within that class hierarchy. The class hierarchy can be any classification to be applied to the data fields used by the sources of data in the organization's storage systems. The term "category" and "class" can be used interchangeably. For example, this classification hierarchy can classify data into categories related to their sensitivity, such as payment information, end user identifying information, account information, internal organizational information, and the like.

In FIG. 5, the computer system accesses the data representing the classification hierarchy, such as in FIG. 4, and generates one or more data structures representing a current view of that data and display data corresponding to those data structures. The display data can include, for example, a graphical element, e.g., 500, for each class, which has a shape, color, and text (e.g., the class name) of the class. In this example implementation, the color and text may be set by a user through the administrator interface as shown below in FIG. 6; the shape can indicate a type of the node in the class hierarchy (e.g., whether it represents a group of classes or it has no subclasses). There is generally a top level or root class (for which there is no parent class), as indicated at 502. As shown in FIG. 5, the root class can have a name such as "Class Tree". A connecting graphical element, such as a line or curve 504, is generated between the graphical element for a class and the graphical element for its respective parent. The graphical elements for classes having the same parent class, e.g., as indicated at 506, are generally presented as a group. When first displayed, the graphical user interface of FIG. 5 may show only the top-level class, e.g., 502, and one or more subclasses, e.g., 506, while hiding the graphical elements for other classes.

The example of FIG. 5 also illustrates that there can be special classes that are useful in supporting an interactive definition and application of rules and classes. One special class can be "Not Categorized" 520. This class generally does not have any rules associated with it. Instead, its class identifier is the default class identifier with which any data field can be associated. After the rules are applied to classify the data fields, any data field which is not classified by the rules is associated with this "Not Categorized" class. Another special class can be "Overrides" 522. The rules associated with an Override class can be applied by the computer system last and can override all other classifications. Rules associated with the Override class can be used to force a data field to be assigned to a specified class.

While FIG. 5 illustrates the class hierarchy such that it can interactively expand from left to right and contract from right to left, the class hierarchy can be displayed in any manner that conveys the class hierarchy to an end user, including but not limited to right to left, top to bottom, bottom to top, as a text outline format, or any other format which can illustrate a hierarchy.

Given a graphical representation of the class hierarchy, such as in FIG. 5, different input gestures (inputs provided by a user to the computer through a variety of input devices through the user interface) can be mapped to different operations to be performed to view and edit the classification hierarchy. There are a wide variety of user interface implementation techniques and a wide variety of gestures that can be defined to select an operation and an object in the interface associated with that operation. The invention is not limited to particular user interface gestures for initiating operations. Some example operations will now be described. These operations generally result in reading and/or modifying data structures representing the view of the data used for generating the graphical user interface. In some cases, when the classification hierarchy is changed in the graphical user interface, the corresponding data representing the classification hierarchy data stored in the storage state database, such as shown in FIG. 4, also is modified.

With respect to viewing the classification hierarchy, operations can be provided to expand, collapse, and hide the display of graphical elements of classes. For example, given a selection of a graphical element representing a class, e.g., 500, an input gesture can direct the computer to expand the display of the hierarchy to include the subclasses of the selected class, e.g., 508. As another example, given a selection of a graphical element representing a class, an input gesture can direct the computer to contract the display of the hierarchy to so as not to display the subclasses of the selected class, e.g., removing classes 508 from the display. As another example, given a selection of a graphical element representing a class, an input gesture can direct the computer to hide the selected class and any of its subclasses.

With respect to editing the classification hierarchy, there are a few categories of operations: re-ordering the classes within the hierarchy, adding a class, which can include copying a class, and removing a class.

A variety of input gestures can be used to invoke re-ordering operations. For example, given a selection of a graphical element representing a class, an input gesture that graphically moves the graphical element, from its initial location to a final location in the display, as illustrated by the arrow 510, can be used to instruct the computer to change the priority of the selected class with respect to the other classes, based on the final location in the display. As another example, the graphical user interface can allow the end user to directly enter or edit data indicating the relative priorities of the classes.

A variety of input gestures can be used to add and remove classes. For example, given a selection of a graphical element representing a class, an input gesture can instruct the computer system to perform an operation with respect to the selected class. For example, a contextual menu can be displayed for the selected graphical element, which presents options for operations to perform on the selected class, such as delete, edit, copy, add group, or add class. Thus, as an example, given a selection of a graphical element representing a class, an input gesture can instruct the computer system to add a new subclass within the selected class. The newly added class can be assigned a default level among other subclasses of the selected class. As another example, given a selection of a graphical element representing a class, an input gesture can instruct the computer system to copy the selected class; another input gesture can instruct the computer system to "paste" the copied class, which creates a new class as a copy of the selected class. Such copying can result in defining a new class in the classification hierarchy using the data for the copied class. Such copying of a class can include copying the references to the rules for that class as well, such that the new class is associated with the same rules as the copied class.

A variety of input gestures can be used to invoke the editing operations applied to a selected class (for example, by invoking the edit operation from a menu while a given class is selected). Such operations are generally performed to view and or edit characteristics about the class, such as its name, description, display color, or other information about the class, and to view and edit rules associated with that class. In one implementation, invoking such an operation can present a user interface as shown in FIG. 6 below.

Figure 6:
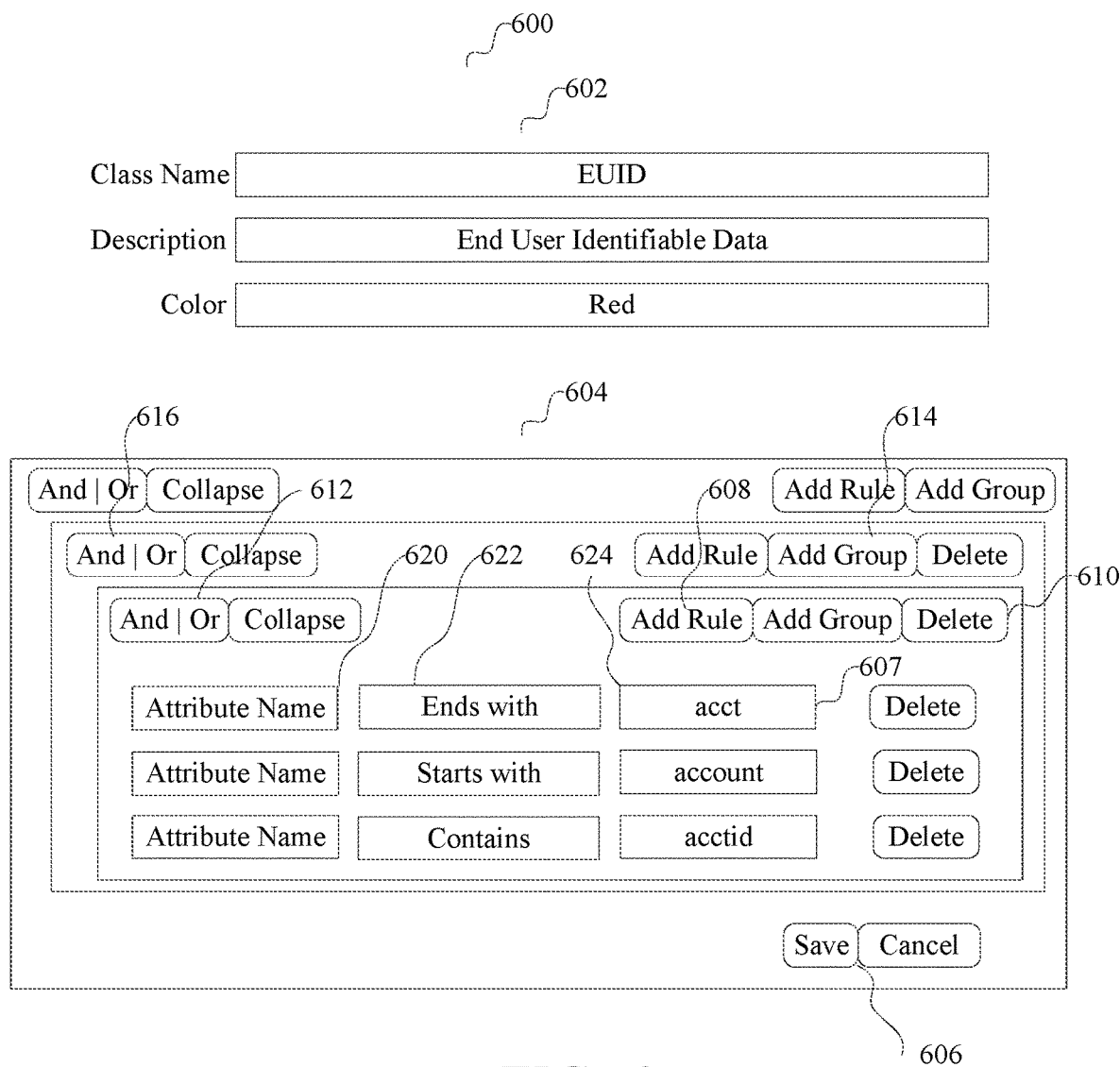
FIG. 6 is an illustration of an example graphical user interface for specifying rules to classify data fields.

FIG. 6 is an illustration of an example graphical user interface for a user to interactively specify rules for a selected class and to edit other data associated with a class.

When a class is selected for editing, such as by using the interface described above in connection with FIG. 5, the computer system can present a graphical user interface for this purpose, an example of which is shown in FIG. 6. In FIG. 6, the interface 600 allows an end user to create, view, modify, and delete rules and other information associated with a class. A first graphical element 602 in the display presents information about the class and may include, for example, text representing a name and a description for the class, and a color used within the graphical user interface to represent that class. In this interface, a user can edit the name, description, and color for the class.

A second graphical element 604 in the display presents any rules currently defined for the class and allows an end user to create, view, modify, and delete rules. In this example implementation, the interface also allows the rules to be grouped and groups of rules can be created, viewed, modified, and deleted. While this interface 600 is displayed, a user can instruct the user to save or cancel any changes (as indicated at 606). Available operations can be associated with graphical elements representing buttons which, when selected by a user through an input gesture, invoke the corresponding operation. Any changes can be retained in a local data structure representing the view of the data for the class until a save operation is invoked to store the changes in the data shown in FIG. 4.

In the example shown at 600 in FIG. 6, rules associated with a class can be defined in hierarchical groups. Within a group, a rule, e.g., 607, can be added (608), modified, and deleted (610). A logical operator (e.g., "and" or "or") for combining the rules within the group also can be specified, e.g., using buttons 612. Also, a group can be added within a group, using buttons 614, and a logical operator (e.g., "and" or "or") can be specified (616) for combining the groups. When such edits are saved, data stored in the data structures shown in FIG. 4 can be updated.

The computer system can present the options to the user to define a rule as a combination of a field 620, or other value, from the storage state database (typically the name of the data field), an operator 622 and a value 624. The computer system can limit the options presented for the field 620 and the operator 622 to those available in the computer system. For example, for field 620, possible values can be the data field name (e.g., 316 FIG. 3), a data type of the field, a character length of the field name, or other attribute of a data field. The computer system can present the limited options in the form of a menu from which the end user can select. The value 624 can be limited to a type of data (e.g., string, integer, etc.) and/or a number of characters (e.g., 32), or can be arbitrary.

In the example shown in FIG. 6, several rules are applied to a field name to determine whether the field name includes some text indicating that the data field may store the name of an account. This group of rules is associated with a class representing "end user identifiable data", as indicated by the name and description of the class at 602. The grouping of rules allows similar rules, from the perspective of the user, to be grouped together. In this example, the group of rules considers whether a data field name includes some variant of a string that might indicate that the data field contains account name data. The grouping of rules also allows users to focus on a small number of rules at time without being overwhelmed with many rules, or complex rules.

As another example, given a selection of a rule or group of rules, an input gesture can instruct the computer system to copy the selected rule or group of rules; another input gesture can instruct the computer system to "paste" the copied rule or group of rules. Such copying can result in defining, for example, a new group of rules for a currently selected class (which can be different from the class from which the rule or group of rules was copied), or a new rule to a currently selected group of rules for a currently selected class. Copying of rules and rule groups facilitates editing of rules and rule groups, especially where rules and rule groups may have similar patterns that can be repeated with variations.

In one implementation, the rules defined through the administration interface can be stored as a combination of attribute-value pairs in an array data type. For example, the rules can be defined in JavaScript Object Notation (JSON) format. When the rules are saved, the computer system also can convert the JSON representation of the rule into a corresponding Structured Query Language (SQL) query and save the SQL query. The representation of the rules, such as in FIG. 4, can include the stored JSON format data and/or the SQL query. In some implementations, a user may be enabled to enter an SQL query as the rule.

For example, assumer a user specified a rule that appears in the user interface as follows:
Group1-OR
   Subgroup1-OR
      data_field_1 endswith "acct"
      data field 1 contains "account"
   Subgroup2-OR
      data_field_2 startswith "firstname"
      data_field_2 startswith "first_name"

With this example, the JSON code would appear, roughly, as follows on the next page:

```
{
    condition: "OR",
    rules: [
        {
            condition: "OR",
            rules: [
                {
                    field: "data_field_1",
                    operator: "endswith",
                    value: "acct"
                },
                {
                    field: "data_field_1",
                    operator: "contains",
                    value: "account"
                }
            ]
        },
        {
            condition: "OR",
            rules: [
                {
```

-continued

```
                    field: "data_field_2",
                    operator: "startswith",
                    value: "firstname"
                },
                {
                    field: "data_field_2",
                    operator: "startswith",
                    value: "first_name"
                }
            ]
        }
    ]
}
```

This JSON code can be readily interpreted into a query in structured query language such as SQL, which would appear, roughly, as follows:

```
WHERE (
(data_field_1 like "%acct" or data_field_1 like "%account%") or
(data_field_1 like "firstname%" or data_field_2 like "first_name%")
)
```

The data structures representing rules, such as in FIG. 4, can be adapted to include data providing one or more representations of a rule, such as the JSON and/or SQL code.

Given the data in the storage state database about the sources of data, such as in FIG. 3, and data defining rules and classes, such as in FIG. 4, the computer system can apply the rules to the data in the storage state database to automatically classify the data fields used in the sources of data for the organization. The resulting combination of information of classes, classified data and infrastructure information enables an organization to know what kinds of data are stored, and where those data are stored.

Figure 7:
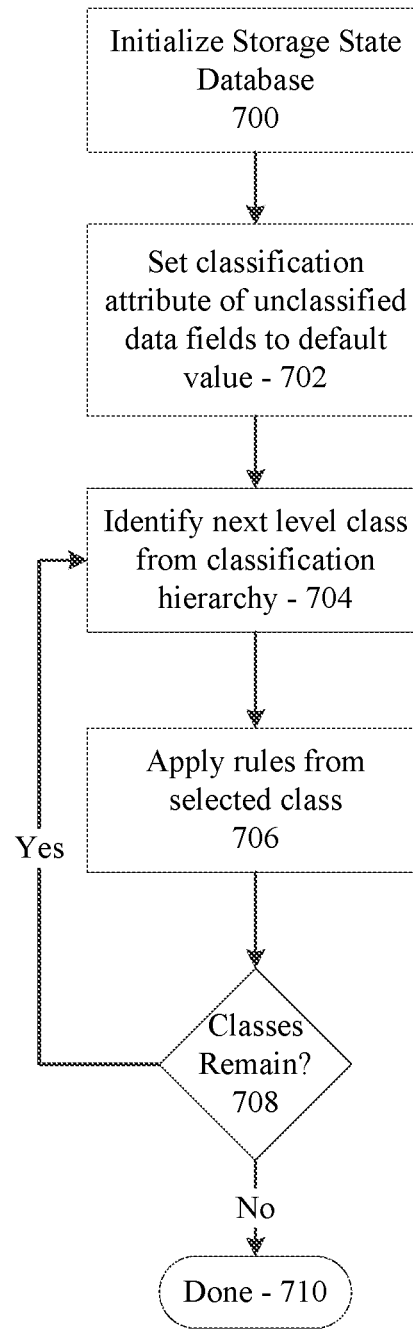
FIG. 7 is a flowchart of operation of an example implementation of the computer system to classify data fields.

FIG. 7 is a flowchart of operation of an example implementation of the computer system to classify the data fields in the storage state database. Whenever data about a source is added to the storage state database, the data fields in that source can be classified by applying the existing rule data and class data to the data about that source using this process.

Referring to FIG. 7, the storage state database is initialized (700) to include the data about the data fields used by the sources of data of the organization. There are many ways to access this information, depending on the source of data and implementation constraints, and the invention is not limited thereto. In some cases, a script can be executed on the source of data to generate information about the source of data, which information is then sent to the computer system 110. In some cases, a source of data may respond to a query, in response to which it generates the requested information and send the information to the computer system 110. For example, a relational database management system can be queried to provide a database scheme describing the database. Updated information can be sent periodically from sources of data to the computer system 110.

Unclassified data fields in the storage state database are processed so that their classification attribute (e.g., 320 in FIG. 3) is set 720 to a default value. For example, the data field can be classified as "not categorized" by setting this classification attribute 320 to a default value representing the "not categorized" classification. In some implementations, where the storage state database is being re-processed, or re-classified, such as after updating it based on current state of the sources of data, the classification attributes 320 can all be reset to the default value.

After the storage state database is initialized, the data fields can be classified by applying the rules of the lowest level class first, and then applying the rules of intermediate level classes, and then applying the rules of the highest-level class last. Thus, the process proceeds with the computer system selecting 704 the next level class from the classification hierarchy. The rules for the selected class are then applied 706 by the computer system to the storage state database. For example, the rules specified for a selected class can be converted to an SQL query. The SQL query, applied to the storage state database, identifies those data fields stored in the storage state database which match the query, and sets the classification attribute of those fields to indicate the selected class.

After performing steps 704 and 706 for a class, the computer system determines if any classes remain (see 708) in the classification hierarchy to be processed. If classes remain, the computer system repeats steps 704-708 for the next class to be processed. Otherwise, the process is completed as indicated at 710.

In some instances, a data field may remain unclassified if none of the rules associated with a class are triggered for that data field. Through the visualization interface to be described below in connection with FIG. 8, such fields can be identified by a user visually. By identifying data fields that are not classified, the computer system can present information about these data fields to a user and enable the user to specify rules for that class. A simple rule can be created for a desired class indicating that any data field for which the contents of the Data Field Name 320 equals the "Data Field Name" of the uncategorized data field, then the data field is to be classified into the desired class.

In some instances, a data field may be classified into a class which is different from the class in which classification was desired or expected. Through the visualization interface to be described below in connection with FIG. 8, all data fields in a selected class can be visualized, allowing an aberration to be visibly detected by a user. In such a case, one or more rules can be defined to force a data field to be in a designated class. Such a rule can be characterized as an "override" rule. Such override rules can be applied after all other rules for classification are applied. For example, a data field may be classified as highly sensitive, but after review a user may conclude that the data field should not have that classification. In such a case, an override rule can be created.

Figure 8:
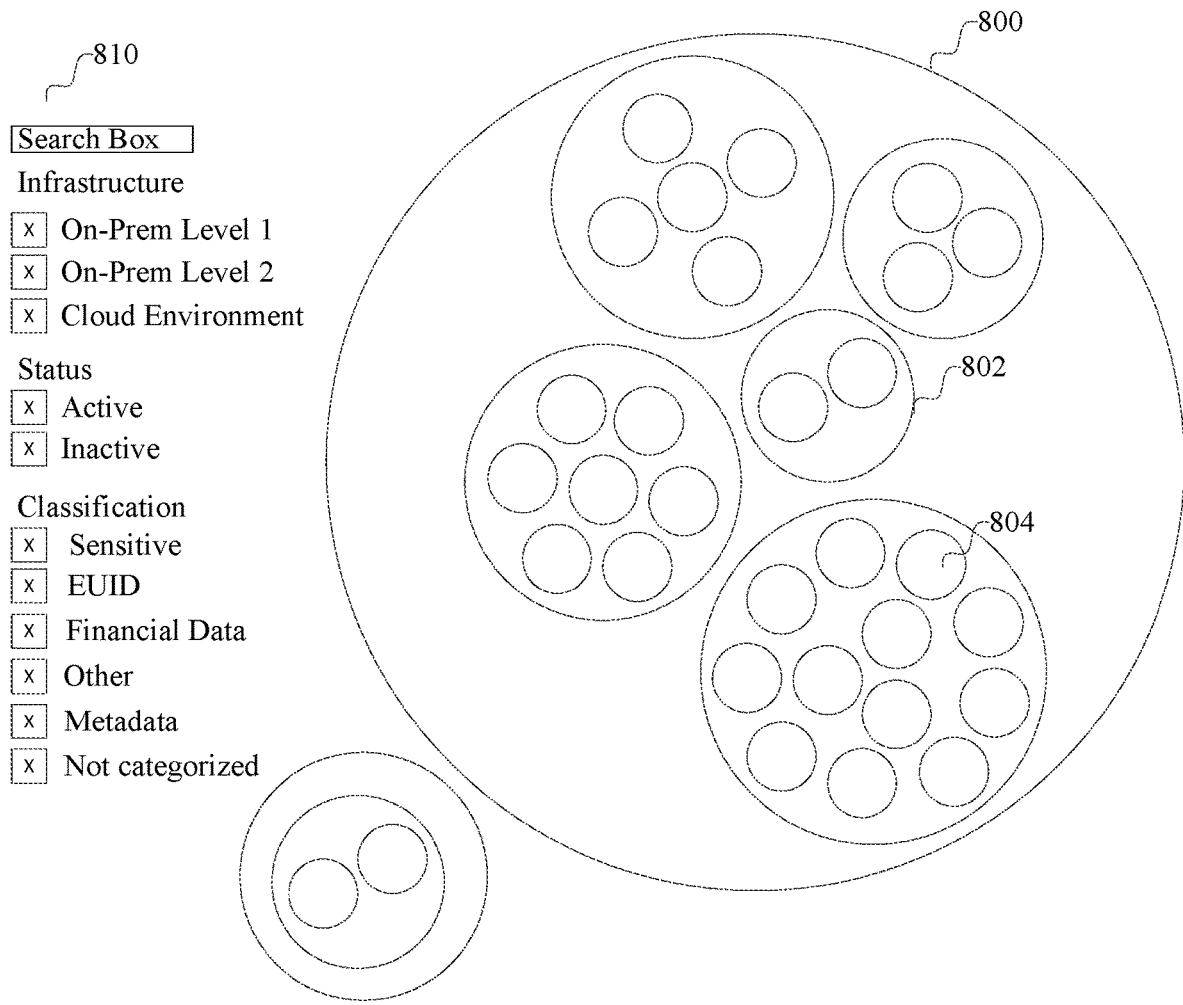
FIG. 8 is an illustration of an example graphical user interface for visualizing data about environments using data in the storage state database.
Figure 9:
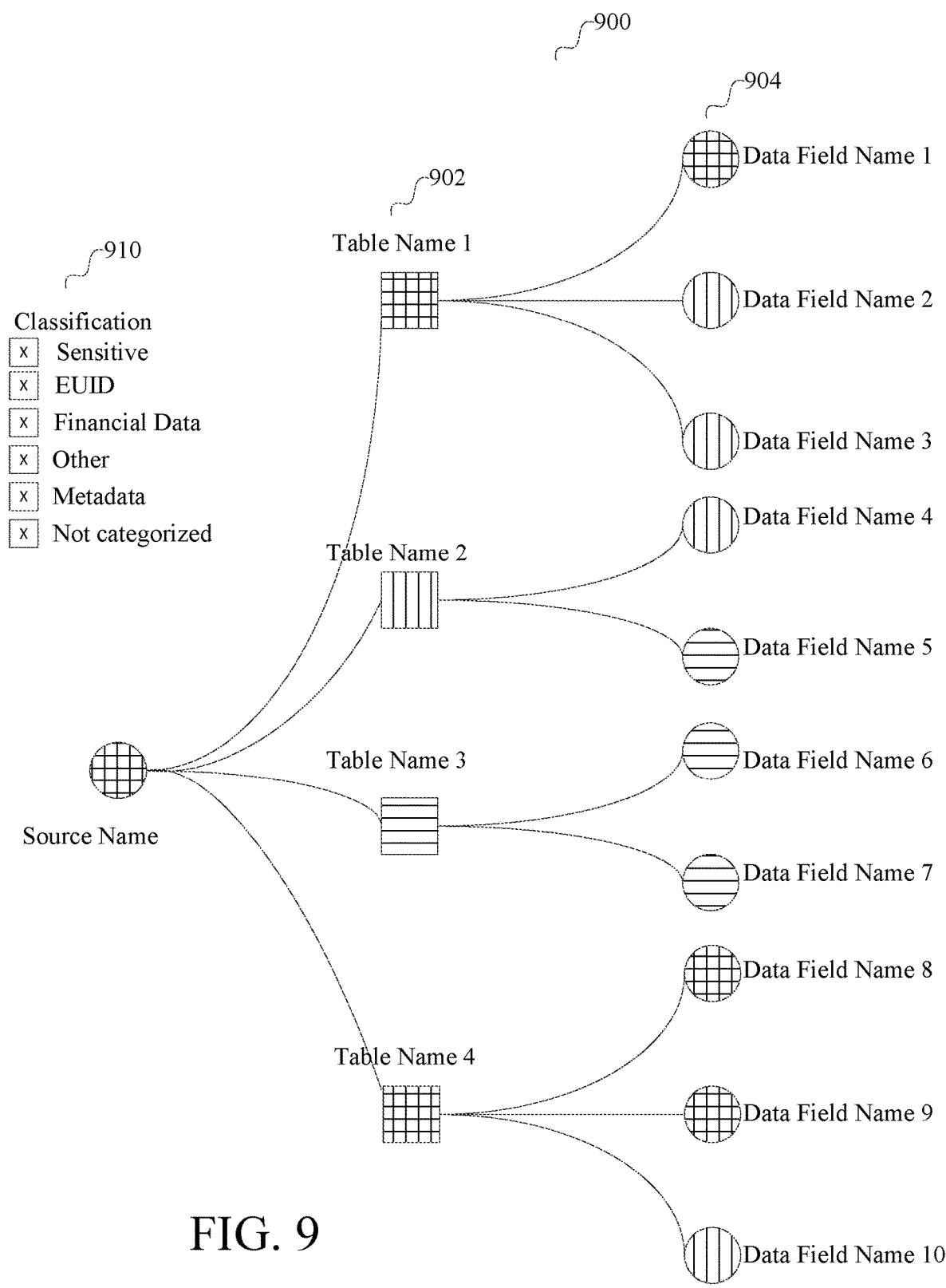
FIG. 9 is an illustration of another example graphical user interface for visualizing data about sources of data using data in the storage state database.
Figure 10:
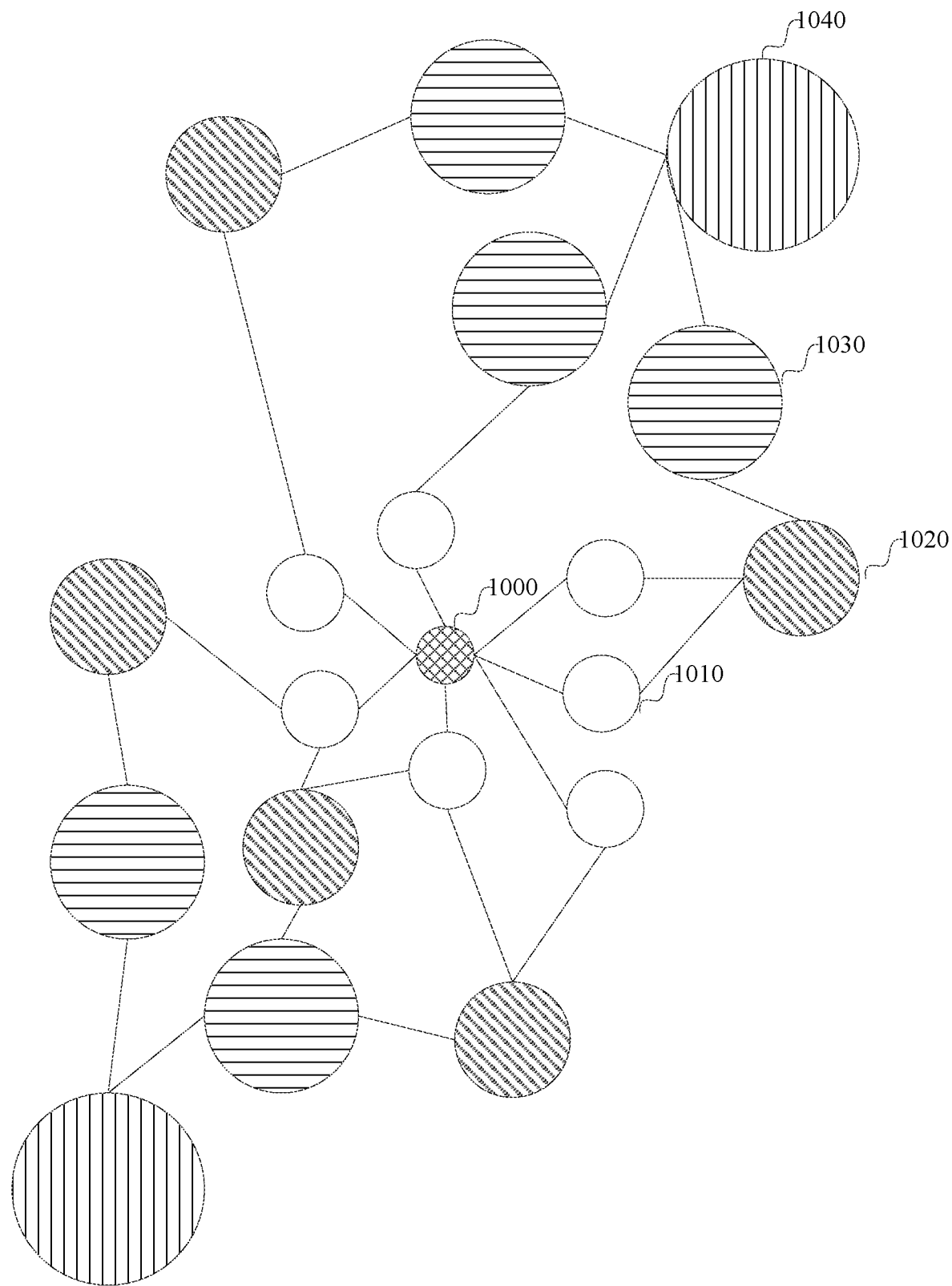
FIG. 10 is an illustration of another example graphical user interface for visualizing data about a set of data fields using data in the storage state database.

After data fields have been classified using the rules, a useful tool for a user is a graphical user interface that allows the user to visualize the results of classification, herein referred to as a visualization interface. FIGS. 8-10 are illustrations of example graphical user interfaces for different visualizations of the data in the storage state database.

In FIG. 8, a system-wide view of the storage state database is shown, from the perspective of the organization's computing environments, such as data centers and cloud environments. In this view, nested graphical objects illustrate how data is classified in the context of the infrastructure supporting the sources of that data.

In FIG. 8, each of the largest circles 800-1 to 800-4 (hereinafter collectively and individually "800") represents a different environment, such as a data center or cloud environment. Within each circle 800 another group of circles 802 is shown, each one representing a different server computer within that environment. Within each circle 802, are yet further circles 804, each one representing a different source of data, such as a database, stored on the server computer.

In this example, the size and position of each circle with respect to other circles representing objects of the same type (e.g., each server computer) can be based on the number of objects of the type (e.g., each source) within that object. In FIG. 8, the smallest circle representing a server computer is positioned at the center of a spiral, from which other circles of increasing size spiral outward. A variety of other presentations of the graphical objects representing the environments, server computers and sources of data can be used, and the invention is not limited to the one shown in FIG. 8.

In one implementation of this view, the color of each circle 804 representing a source can be the color corresponding to the highest-level classification of a data field in that source. The color of each circle 802 representing a server computer can be the color corresponding to the source having the data field with the highest-level classification among the sources on that server computer. The color of an object representing an environment can be the color corresponding to the server computer having the source having the data field with the highest-level classification among the server computers in that environment.

While the system-wide view of the sources of data is displayed, various operations can be provided to manipulate the display. For example, given a selection of a graphical object representing a database, an input gesture can direct the computer to switch to another view focused on a selected source, an example of which is described below and shown in FIG. 9.

As another example, an input gesture can direct the computer to limit the display to selected types of sources of data, selected types of server computers, and selected types of environments, by filtering the view based on the infrastructure information provided in the storage state database, such as in FIG. 3. As another example, an input gesture can direct the computer to generate the display for only selected classes of data, illustrating where data fields of one or more selected classes reside, by filtering the view based on the classification information of data fields such as in FIG. 3. Options to provide such filtering can be presented as an interface within the graphical user interface of FIG. 8. An example of such a filtering interface is shown at 810.

FIG. 9 shows a source view of the storage state database, to view the classification of individual data fields used by a selected source. After a user selects an individual source of data, such as by an input gesture associated with a selected circle 804 in FIG. 8, display data 900 representing the data fields used in that source is generated, e.g., based on the data field table 310 for that source (see FIG. 3). This display data can present the information about the data fields from that source in the form of, for example, a tree. One level of nodes can represent individual tables of data within the source, such as shown at 902. There may be one or more intermediate levels. The last nodes 904 represent the individual data fields. Each data field is represented by a graphical object, with a human readable identifier for the data field, such as a name, and an indication of the classification of that data field, such as a color.

An interface 910 can be provided to allow an end user to filter or select different classes so that the display data 900 only includes representations of the data fields in the selected class(es). This interface can be generated based on the classification hierarchy, e.g., as shown in FIG. 4. This interface is useful for identifying and viewing individually each uncategorized data field, or each sensitive data field, for example.

In FIG. 10, a data field view of the storage state database is shown. This interface shows information about data fields that match a selected criterion, such as whether a data field name matches a query. The selected data fields are shown in the context of their sources and the infrastructure information for those sources. This view can be used, for example, to identify which sources use similar data field names, and where those sources reside. For example, there may be multiple databases which have a field called "First Name". For this example, in this view in FIG. 10, data fields having the same data field name, e.g., "First Name", can be viewed in context of their source and infrastructure information.

To construct this view, the storage state database can be searched to identify all records having a data field name or other attribute that matches a user's search query. The infrastructure information for each of the matching fields is accessed. This view provides a graphical representation of how many different sources use data fields having the same attribute, such as the same data field name. A reference object 1000 in the display in FIG. 10 represents the matching data fields. Then, using the infrastructure information, objects representing each collection of data including one of the matching data fields are shown, e.g., at 1010. Objects representing each source including those collections are shown, e.g., at 1020. Objects representing each server computer supporting those sources are shown, e.g. at 1030. Objects representing each environment housing such server computers are shown, e.g., at 1050.

It should be understood that the interfaces shown in FIGS. 8 through 10 are merely illustrative and not limiting. A wide variety of interfaces can be provided to visualize aspects of the data fields and infrastructure information stored in the storage state database.

By maintaining a storage state database with information about data fields used in sources of data within an organization's computer network, along with infrastructure information, this information can be processed and updated without interfering with ongoing operation and use of the organization's computer systems. By providing an interface through which a user can specify classes and rules associated with those classes, a user can flexibly, interactively and intuitively define classes and rules without interacting with the sources of data. Because the classes and rules are defined separately from the sources of data, new sources of data can be added, and sources of data can be updated, and the existing classifications can be readily applied to updated information about these sources. Further, by applying rules associated with classes, the computer system can automate classifying these data fields in way that accomplishes this task which otherwise could not reasonably be performed manually.

The storage state database can be augmented with additional data, such as access logs related to the data. Rules also can be defined for, and applied to, this additional data to provide further information about the data fields in the storage state database. This additional data and further information also can be presented in the graphical user interface.

Figure 11:
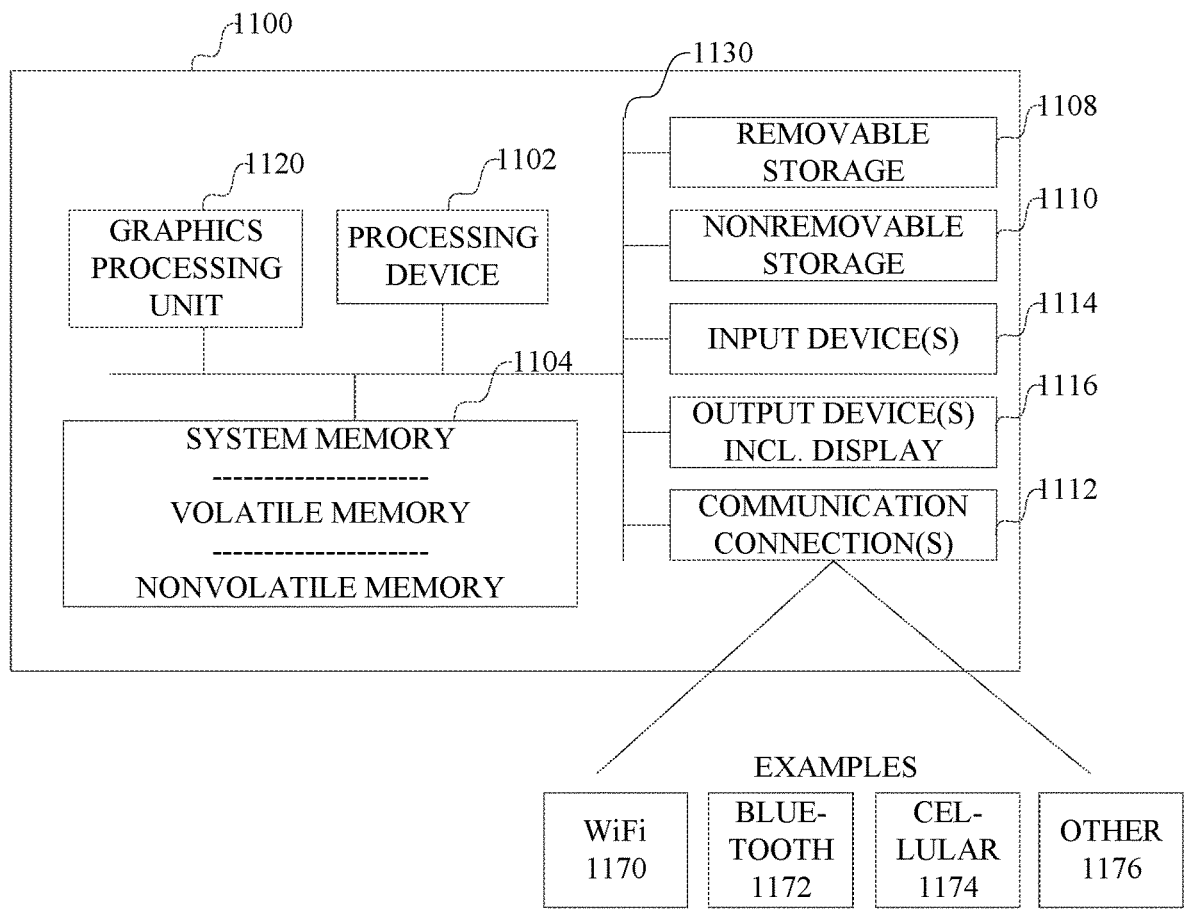
FIG. 11 is a block diagram of an example computer.

Having now described an example implementation, FIG. 11 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 11, a computer 1100 includes a processing system comprising at least one processing device 1102 and at least one memory 1104. The processing device 1102 can include multiple processing devices; the memory 1104 can include multiple memory devices. A processing device 1102 comprises a processor which is logic circuitry which responds to and processes instructions to provide the functions of the computer. A processing device can include one or more processing cores (not shown) that are multiple processors within the same logic circuitry that can operate independently of each other. Generally, one of the processing devices in the computer is designated as a primary processor, typically called the central processing unit (CPU). One or more additional co-processing units, such as a graphics processing unit (GPU) 1120, also can be present in the computer. A co-processing unit comprises a processor that performs operations that supplement the central processing unit, such as but not limited to graphics operations and signal processing operations.

The memory 1104 may include volatile computer storage devices (such as dynamic random-access memory (DRAM) or other random-access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 1100 can include additional computer storage devices (whether removable or non-removable) such as, but not limited to, magnetically-recorded or optically-recorded disks or tape. Such additional computer storage devices are illustrated in FIG. 1 by removable storage device 1108 and non-removable storage device 1110. Such computer storage devices 1108 and 1110 typically are nonvolatile storage devices. The various components in FIG. 11 are generally interconnected by an interconnection mechanism, such as one or more buses 1130.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 1104, removable storage 1108 and non-removable storage 1110 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 1100 may also include communications connection(s) 1112 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 1112 are devices, such as a wired network interface, wireless network interface, radio frequency transceiver, e.g., Wi-Fi 1170, cellular 1174, long term evolution (LTE) or Bluetooth 1172, etc., transceivers, navigation transceivers, e.g., global positioning system (GPS) or Global Navigation Satellite System (GLONASS), etc., transceivers, and network interface devices 1176, e.g., Ethernet, etc., or other device, that interface with communication media to transmit data over and receive data from signal propagated over the communication media.

The computer 1100 may have various input device(s) 1114 such as a pointer device, keyboard, touch-based input device, pen, camera, microphone, sensors, such as accelerometers, thermometers, light sensors and the like, and so on. The computer 1100 may have various output device(s) 1116 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 1108 and 1110, communication connections 1112, output devices 1116 and input devices 1114 can be integrated within a housing with the rest of the computer, or can be connected through various input/output interface devices on the computer in which case the reference numbers 1108, 1110, 1112, 1114 and 1116 can indicate either the interface for connection to a device or the device itself.

A computer generally includes an operating system, which is a computer program that, when executed, manages access, by other applications running on the computer, to the various resources of the computer. There may be multiple applications. The various resources include the processing devices, coprocessing units, memory, storage, input devices and output devices, such as display devices and input devices as shown in FIG. 11. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. A file system generally provides operations such as creating a file, opening a file, writing a file or its attributes, reading a file or its attributes, and closing a file.

The various modules, tools, or applications, and data structures and flowcharts, and graphical user interfaces, described in connection with FIGS. 1-10, as well as any operating system, file system and applications on a computer in FIG. 11, can be implemented using one or more processing devices of one or more computers with one or more computer programs processed by the one or more processing devices.

A computer program includes computer-executable instructions and/or computer-interpreted instructions, such as program modules, which instructions are processed by one or more processing devices or co-processing units in the computer. Generally, such instructions define routines, programs, objects, components, data structures, and so on, that, when processed by a processing device, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer system includes a storage state database stored in a computer storage device. The storage state database includes data about data fields used by sources of data stored on computers. Also stored in computer storage are class data, specifying a plurality of classes, and rule data, specifying a collection of rules. Each rule specifies one or more conditions to be applied to the data about data fields and corresponding to a class from the plurality of classes. A first graphical user interface receives the rule data and the class data to generate display data representing the rule data and the class data, and, in response to user input, modifies the rule data and the class data. A rules engine applies the rule data to the data about the data fields in the storage state database to associate classes of the plurality of classes with the data fields. The rules engine stores, in the storage state database, for each data field, data indicating any class associated with the data field resulting from applying the rules. A second graphical user interface receives data from the storage state database, and, in response to user input, interactively generates display data representing the data fields and the classes associated with the data fields.

In another aspect, a computer-implemented process is performed by a computer comprising a processing system and a computer storage device. On the computer storage device, the computer stores a storage state database including data about data fields used by sources of data on computers, class data specifying a plurality of classes, and rule data specifying a collection of rules, each rule specifying one or more conditions to be applied to the data about data fields and corresponding to a class from the plurality of classes. The computer applies the rule data to the data about the data fields in the storage state database to associate classes of the plurality of classes with the data fields. The computer stores, in the storage state database, for each data field, data indicating any class associated with the data field resulting from applying the rules. The computer receives data from the storage state database, and, in response to user input, interactively generates display data representing the data fields and the classes associated with the data fields.

In another aspect, a computer system comprises a storage state database including data about data fields used by sources of data on computers. The computer includes means for enabling a user to interactively define class data specifying a plurality of classes, and rule data specifying a collection of rules, each rule specifying one or more conditions to be applied to the data about data fields and corresponding to a class from the plurality of classes. The computer system comprises means for applying the rules to data about data fields to associate classes of the plurality of classes with the data fields, and to store, in the storage state database, for each data field, data indicating any class associated with the data field resulting from applying the rules. The computer can include a means for interactively visualizing information in the storage state database.

In any of the foregoing aspects, the storage state database can include data indicating infrastructure information associated with the sources of data. The classification of data fields can be displayed interactively in context of the infrastructure information.

In any of the foregoing aspects, the data about data fields can include a name of a data field. The rule data can specify a condition applied to the names of data fields.

In any of the foregoing aspects, the rule data can specify a group of rules which includes a logical operator for combining rules in the group.

In any of the foregoing aspects, the rule data can be represented by attribute-value pairs. The computer system can convert such rule data into a query in a query language applicable to the storage state database.

In any of the foregoing aspects, the display data of the first graphical user interface can include, for a selected class, rules associated with the selected class.

In any of the foregoing aspects, the display data of the second graphical user interface can include a graphical representation of a source. The graphical representation of the source can be indicative of a highest-level classification of any data field in the source.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

The subject matter defined in the appended claims is not necessarily limited to the specific implementations described above. The specific implementations described above are disclosed as examples only.

What is claimed is:

1. A computer system, comprising:
a processing system accessing computer program instructions that, when executed by the processing system, configures the computer system to be comprising:
a storage state database stored in a computer storage device including information about data fields used by disparate sources of data stored on computers separate from the storage state database, the storage state database not including the data fields;
class data stored in the computer storage device and specifying a plurality of classes;
rule data stored in the computer storage device and specifying a collection of rules, each rule specifying one or more conditions to be applied to the information about data fields and corresponding to a class from the plurality of classes,
the rule data and the class data provided to a client computer that renders a first graphical user interface that displays the rule data, the class data, and a graphical representation having multiple views corresponding to types and locations of the data stored on the computers, where the first graphical user interface receives user input to modify the rule data and the class data; and
a rules engine applying the modified rule data to the information about data fields in the storage state database to associate classes of the plurality of classes with the data fields, and storing in the storage state database, for each data field, an indication of any class associated with the data field resulting from applying the modified rule data;
wherein data from the storage state database is provided to the client computer that renders a second graphical user interface that, in response to user input, interactively generates display data representing the data fields and the classes associated with the data fields.

2. The computer system of claim 1, wherein the storage state database includes data, for each source of data, indicating infrastructure information associated with the source of data.

3. The computer system of claim 1, wherein the information about data fields includes a name of a data field, and wherein the rule data specifies a condition applied to the name of a data field.

4. The computer system of claim 1, wherein the rule data specifies a group of rules and includes a logical operator for combining the rules in the group.

5. The computer system of claim 1, wherein the rule data is represented by attribute-value pairs, and the computer system is further configured to convert the rule data into a query in a query language applicable to the storage state database.

6. The computer system of claim 1, wherein the first graphical user interface is configured to display, for a selected class, rules associated with the selected class.

7. The computer system of claim 2, wherein the display data of the second graphical user interface includes a graphical representation of a source, wherein the graphical representation of the source is indicative of a highest-level classification of any data field in the source.

8. A computer-implemented process performed by a computer comprising a processing system and a computer storage device, the computer storing in the computer storage device a storage state database including information about data fields used by disparate sources of data on computers separate from the storage state database, class data specifying a plurality of classes, and rule data specifying a collection of rules, each rule specifying one or more conditions to be applied to the information about data fields and corresponding to a class from the plurality of classes, the storage state database not including the data fields, the computer-implemented process comprising:

providing the rule data and the class data to a client computer that renders a first graphical user interface that displays the rule data, the class data, and a graphical representation having multiple views corresponding to types and locations of the data stored on the computers, where the first graphical user interface receives user input to modify the rule data and the class data;

applying the modified rule data to the information about data fields in the storage state database to associate classes of the plurality of classes with the data fields;

storing in the storage state database, for each data field, an indication of any class associated with the data field resulting from applying the modified rule data; and providing data from the storage state database to the client computer that renders a second graphical user interface, and, in response to user input, interactively generates display data representing the data fields and the classes associated with the data fields.

9. The computer-implemented process of claim 8, wherein the storage state database includes data, for each source of data, indicating infrastructure information associated with the source of data.

10. The computer-implemented process of claim 8, wherein the information about data fields includes a name of a data field, and wherein the rule data specifies a condition applied to the name of a data field.

11. The computer-implemented process of claim 8, wherein the rule data specifies a group of rules and includes a logical operator for combining the rules in the group.

12. The computer-implemented process of claim 8, wherein the rule data is represented by attribute-value pairs, and the computer-implemented process further comprises converting the rule data into a query in a query language applicable to the storage state database.

13. The computer-implemented process of claim 8, wherein the first graphical user interface is configured to display, for a selected class, rules associated with the selected class.

14. The computer-implemented process of claim 9, wherein the display data of the second graphical user interface includes a graphical representation of a source, wherein the graphical representation of the source is indicative of a highest-level classification of any data field in the source.

15. An article of manufacture comprising a computer storage device having computer program instructions stored thereon, wherein the computer program instructions, when processed by a computer comprising a processing device, configures the computer to comprise:

a storage state database stored in a computer storage device and including information about data fields used by disparate sources of data on computers separate from the storage state database, the storage state database not including the data fields, class data stored in the computer storage device and specifying a plurality of classes, and rule data stored in the computer storage device and specifying a collection of rules, each rule specifying one or more conditions to be applied to the information about data fields and corresponding to a class from the plurality of classes, the rule data and the class data provided to a client computer that renders a first graphical user interface that displays the rule data, the class data, and a graphical representation having multiple views corresponding to types and locations of the data stored on the computers, where the first graphical user interface receives user input to modify the rule data and the class data; and a rules engine applying the modified rule data to the information about data fields in the storage state database to associate classes of the plurality of classes with the data fields and storing in the storage state database, for each data field, an indication of any class associated with the data field resulting from applying the modified rule data; and wherein data from the storage state database is provided to the client computer that renders a second graphical user interface that, in response to user input, interactively generates display data representing the data fields and the classes associated with the data fields.

16. The article of manufacture of claim 15, wherein the storage state database includes data, for each source of data, indicating infrastructure information associated with the source of data.

17. The article of manufacture of claim 15, wherein the information about data fields includes a name of a data field, and wherein the rule data specifies a condition applied to the name of a data field.

18. The article of manufacture of claim 15, wherein the rule data specifies a group of rules and includes a logical operator for combining the rules in the group.

19. The article of manufacture of claim 15, wherein the first graphical user interface is configured to display, for a selected class, rules associated with the selected class.

20. The article of manufacture of claim 16, wherein the display data of the second graphical user interface includes a graphical representation of a source, wherein the graphical representation of the source is indicative of a highest-level classification of any data field in the source.

\* \* \* \* \*